Feb. 12, 1924.

P. J. MARKS

PHOTOGRAPHIC SHUTTER

Filed Dec. 29, 1919    4 Sheets-Sheet 1

1,483,465

Feb. 12, 1924.  
P. J. MARKS  
1,483,465  
PHOTOGRAPHIC SHUTTER  
Filed Dec. 29, 1919  
4 Sheets-Sheet 2

INVENTOR.  
Paul J. Marks  
BY Nelson A. Hallauer  
his ATTORNEY

INVENTOR.
Paul J. Marks
BY Nelson A. Hallauer
his ATTORNEY

Patented Feb. 12, 1924.

1,483,465

UNITED STATES PATENT OFFICE.

PAUL J. MARKS, OF ROCHESTER, NEW YORK.

PHOTOGRAPHIC SHUTTER.

Application filed December 29, 1919. Serial No. 348,179.

*To all whom it may concern:*

Be it known that I, PAUL J. MARKS, a citizen of the United States, residing at Rochester, in the county of Monroe, State of New York, have invented certain new and useful Improvements in Photographic Shutters; and I do declare the following to be a clear, full, and exact description of the same, reference being had to the accompanying drawings, forming a part of this specification.

My invention relates to photographic shutters of the kind used with cameras or other photographic instruments. The principal object of my invention is to provide a shutter which is automatic in action, extremely rapid in action, and which is adapted to more fully expose the sensitive plate or film in a given short interval of time than shutters heretofore constructed. A further object of my invention is to provide a shutter of this kind having a small exterior diameter and large lens opening, especially adapting it for use on small hand cameras. Another object of my invention is to provide a shutter with two sets of blades, one set of which is opened for an exposure, while another set is moved to closed position to terminate the exposure. Another object of my invention is to construct a shutter in which the blades are of such a form that a more even distribution of the light is secured on the sensitive plate or film. Another object of my invention is to provide blade operating devices adapted to alternately move the blades to open and closed position. A still further object of my invention is to provide a shutter with a setting device which is movable in either direction from time position to set the shutter for bulb and instantaneous exposures. To these and other ends my invention resides in certain improvements, combinations and arrangements of parts all as hereinafter more fully described, and particularly pointed out in the appended claims.

Figure 15:
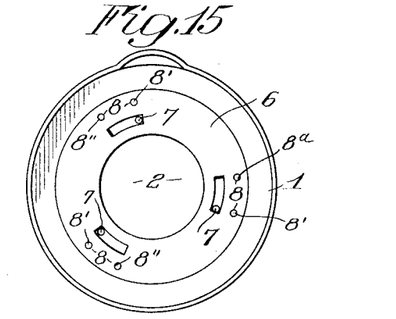
Figure 15 is a similar view with the blades removed and showing the blade operating ring in position in the casing.
Figure 16:
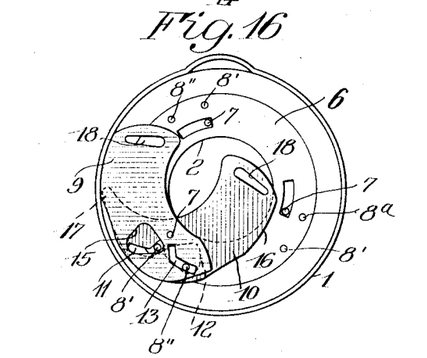
Figure 16 is a view similar to Figure 15, with one blade of each set in position thereon.
Figure 17:
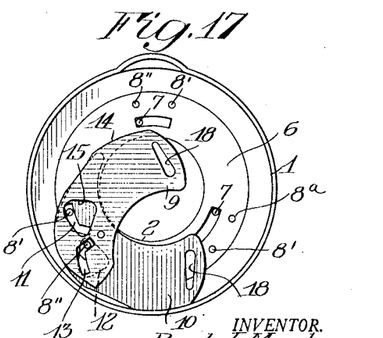
Figure 17 is a similar view showing the parts in other relations.

Referring more particularly to the drawings, a shutter constructed according to my invention comprises a casing 1 of substantially cylindrical form having a lens aperture 2 through the center thereof. If desired the rear side of the casing may be provided with a screw flange adapted to receive the rear lens combination. The front or open side of the casing may be closed by the cover 3 secured in position on the casing by means of screws or otherwise and provided with the scale 4 with which the pointer 5 for adjusting the usual iris diaphragm cooperates. As best shown in Figures 15, 16 and 17, a ring 6 having a central aperture corresponding to the lens aperture of the casing is mounted in the casing and has a limited oscillatory or reciprocating movement therein. A plurality of studs or pins 7 are fixed in the casing and project outwardly through slots provided therefor in the ring 6. Three of these pins are illustrated in the drawings, although it will be understood that a different number may be used if required. The pins 7 are arranged equidistantly from each other and from the center of the casing.

Fixed in the ring 6 are a plurality of pairs of pins, studs or projections 8 and corresponding in number to the fixed pins 7, each pair comprising a projection 8' and 8' or 8$^a$. Pivotally mounted on each of the pins 7 is a pair of blades 9 and 10 extending in opposite directions from the pivot. The blades 9 overlie the blades 10 and together constitute one set of blades, while the blades 10 constitute another set of blades. In the embodiment illustrated, the pins 8' serve to operatively connect the blades of the set 10 with the ring 6. For this purpose the blades 10 are provided with angular slots 11 into which the pins 8' project. The arrangement of the slots 11 in the blades is such that as the ring 6 moves in a clockwise direction from the position shown in Fig. 16, the blades 10 are moved to open the aperture during the first part of such movement of the ring and during the remainder of such movement the blades 10 remain idle in the open position shown in Figure 17. As the ring 6 returns from the Figure 17 position to the Fig. 16 position, the pins 8' move idly in the slots during the first part of the movement of the ring until they reach the angles in the slots when the blades are again moved to close the aperture. The blades 10 have cut out portions 12 to provide clearances for the pins or studs 8'' and 8$^a$. The pins 8'' and 8$^a$ are similarly connected with the blades 9. For this purpose the blades 9 are provided with angular slots 13 into which the pins 8'' and 8$^a$ project. The arrangement of the slots 13 is such that as the ring 6 moves in a counter clockwise direction from the position shown in Fig. 17, the blades 9 are moved to the open position shown in Figure 16 during the first part of such movement and thereafter the pins move idly in their slots. During the return movement of the ring to the Figure 17 position, the pins again move idly in their slots until they reach the angles thereof when the blades are again moved to close the aperture. Means are provided for moving the ring 6 in one direction for one exposure and in the opposite direction for the next exposure. In other words, as the ring is moved from the Fig. 16 position to the Fig. 17 position, the blades 10 are first moved to open the aperture while the blades 9 remain idle, the blades 9 are then moved to close the aperture while the blades 10 remain idle. When the movement of the ring is reversed for the next exposure, the blades 9 are first moved to open the aperture and the blades 10 are then moved to close the aperture. During each exposure one set of blades is moved to open the aperture and the other set to close the aperture.

Figure 9:
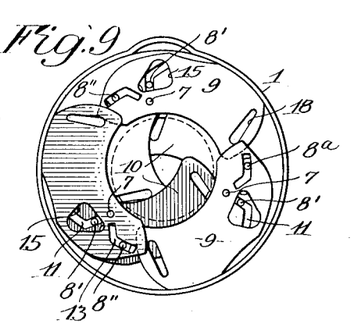
Figure 9 is a similar view showing the position of the blades after an initial movement toward open position.
Figure 10:
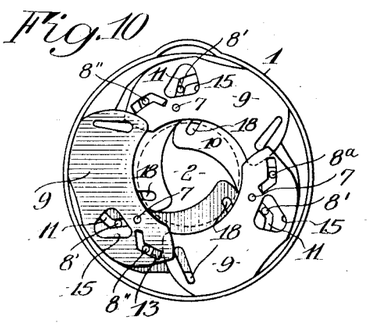
Figure 10 is a similar view showing the position of the blades at a time just before they reach the open position.
Figure 11:
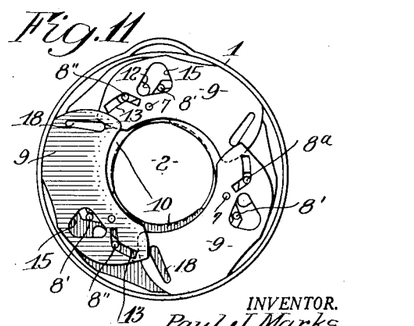
Figure 11 is a similar view showing the aperture completely open.
Figure 12:
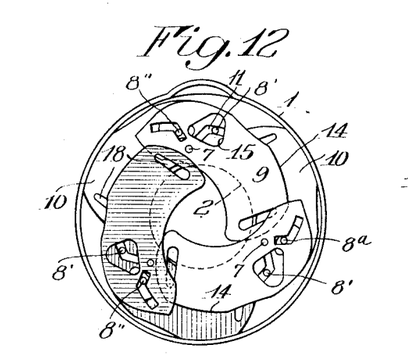
Figure 12 is a similar view showing the position of the parts after an initial movement of the forward set of blades toward closing position.
Figure 13:
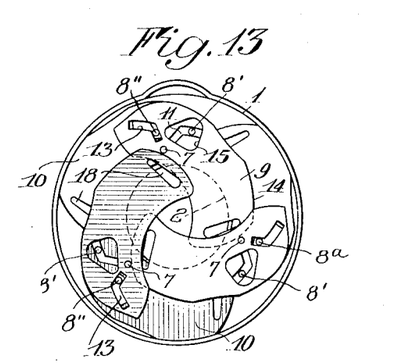
Figure 13 is a similar view showing the position of the forward set of blades just before the aperture is completely closed.
Figure 14:
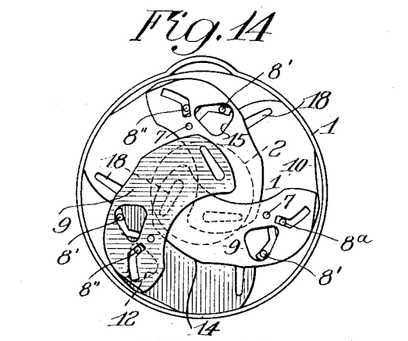
Figure 14 is a similar view showing the forward set of blades in closed position.

Each of the blades 9 is of the form clearly shown in Fig. 16, being constructed of thin sheet material somewhat elongated in form and provided with the shoulder 14 adapted to engage the inner wall of the casing when the blades are open, and have the cut out portions or openings 15 to clear the pins 8'. The blades 10 have the shoulders 16 which engage the inner wall of the casing when the blades are open and the tail pieces 17 adapted to engage the inner wall of the casing when the blades are closed. Each of the blades 9 and 10 are provided with cut-away portions, or openings 18 adapted to admit light from the margin of the aperture simultaneously with the admission of light from the center of the aperture during the opening and closing movements of the blades. Fig. 13 shows the blades 9 partially closing the aperture and Fig. 9 shows the blades 10 partially closing the aperture. By comparing these figures, it will be noted the openings in the blades 9 admit light from the margin of the aperture at points intermediate the points where the light is admitted by the blades 10. It will also be noted that an area of substantially the form of a ring is formed between the center opening and marginal openings, at which the light is retarded or obstructed. The blades are formed in such a manner that the openings are star shaped with the points extending nearly to the margin of the aperture before the aperture is entirely open, and a comparison of Figures 10 and 12 will show that the star opening formed by one set of the blades occupies a different position in the aperture from that formed by the other set of blades. It will be noted that by this construction of the blades a large volume of light can be admitted through the aperture in an exceedingly short interval of time and that light is much more evenly distributed on the sensitive plate than has been possible with shutters heretofore constructed. A partition 20 is secured in the casing over the blades and forms a support for the operating mechanism presently to be described. The partition 20 is slotted at 21 and the stud 8ᵃ on the ring 6 projects through this slot. A blade actuating member 22 is pivoted on the partition at 23 and is operatively connected with the stud 8ᵃ on the ring 6 by means of the link 24. The member 22 has a portion 25 bent over on itself to engage the pivot 23 and serves to increase the bearing surface of said member on its pivot. On each side of its pivot, as at 26 and 27, the blade actuating member is cut away or notched for a purpose presently to be described.

Figure 4:
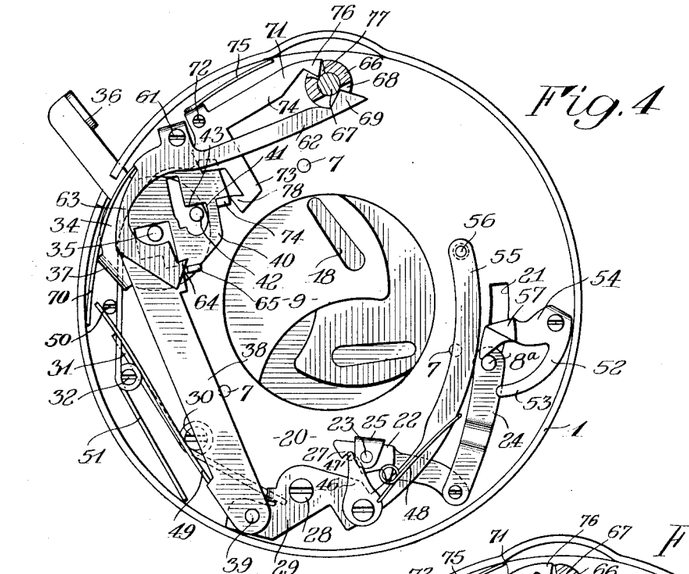
Figure 4 is a view similar to Figure 2, but showing the position of the parts when the lens aperture is closed by the other set of blades.
Figure 7:
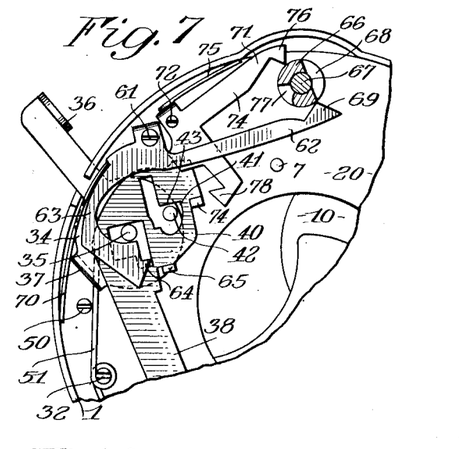
Figure 7 is a view similar to Figure 6 showing the position of the parts when the setting devices are set for an "instantaneous" exposure.
Figure 8:
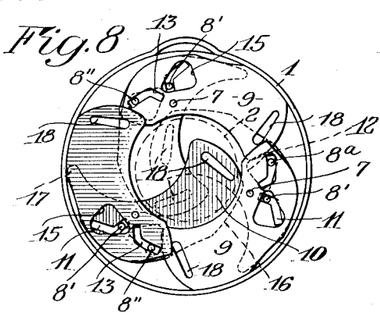
Figure 8 is a front elevation with the partition plate removed to expose the blades and showing the aperture closed by the rear set of blades.

Pivoted on the partition by means of a shouldered screw 28 is a master member 29. Secured to or engaging the master member and coiled about a screw 30 fixed to the partition is a motor or master spring 31, the free end of which engages, or is anchored against a screw or projection 32 on the partition 20. The master member has a portion 33 bent over on itself and has a bearing on the pivot 28 and serves to increase the bearing surface of the master member on its pivot. A trigger 34 is pivoted to the partition at 35 and has a finger piece 36 projecting through an elongated slot in the wall of the casing by which it may be operated manually or otherwise. The trigger also has a portion 37 bent over on itself that has a bearing on its pivot 35, and serves to increase the bearing surface of the trigger. A link 38 is pivoted to the master member at 39 and has an enlarged portion 40 extending over the trigger. The enlarged portion 40 of the link is provided with a substantially L-shaped slot 41 adapted to cooperate with a stud or projection 42 fixed to the trigger. The shorter leg of the slot 41 provides a shoulder 43 adapted to be engaged by the stud 42 and is cut away as at 44 to provide a clearance for the stud. The enlarged portion of the link is also provided with an enlarged opening to provide a clearance for the pivot 35 of the trigger. With the parts set for an instantaneous exposure as illustrated in Fig. 7, depression of the finger piece 36 swings the trigger on its pivot and the stud 42 engages the shoulder 43 on the link and moves the link to swing the master member on its pivot to tension the motor spring 31. At this time, the stud 42 rides off the shoulder 43 and permits the motor spring to return the master member and the link to the normal position shown in Fig. 7. An arm or dog 46 is pivoted on the master member and has an offset portion or projection 47 at its free end adapted to alternately engage the notches 26 and 27 of the blade actuating member 22. Means are provided for automatically moving the arm 46 from a position to engage the notch 26 to a position to engage the notch 27 and vice versa, on opposite sides of the pivot 23 to successively or alternately swing the blade operating member in opposite directions. Said means comprises a spring 48 secured to the arm 46 and adapted to engage the inner wall of the casing with the parts in the position shown in Figure 2. When the trigger is depressed to tension the motor spring and retract the master member, the spring 48 moves the arm 46 out of engagement with the notch 26 and into engagement with the notch 27 on the blade actuating member, or to the position shown in Fig. 3 of the drawings. The spring 48 now engages the master member and when the parts have moved to again close the aperture, they occupy the position shown in Fig. 4 of the drawings. When the trigger is again depressed with the parts in the Fig. 4 position, the master member is retracted and the spring 48 now engaging the master member swings the arm 46 in the reverse direction into engagement with the notch 26 to move the blade actuating member in the reverse direction.

Figures 1, 2, 3, 18, 19:
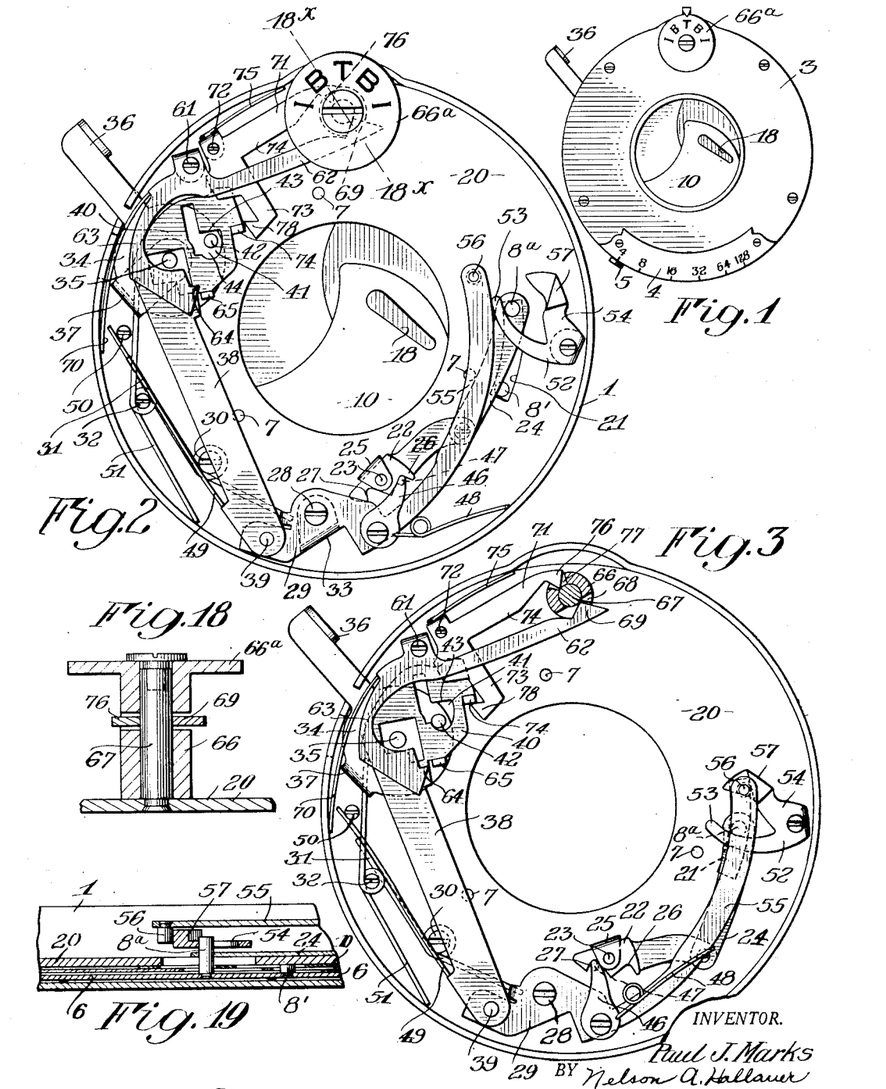
Figure 1 is a front elevation of a photographic shutter constructed according to my invention.
Figure 2 is an enlarged view of the same with the cover plate removed and showing the blades closed and the operating devices set for a time exposure.
Figure 3 is a view similar to Figure 2, showing the position of the parts after the trigger has been actuated to open the blades.
Figure 18 is a section on the line 18×—18× Figure 2.
Figure 19 is a section on line 19×—19× Fig. 5.
Figure 5:
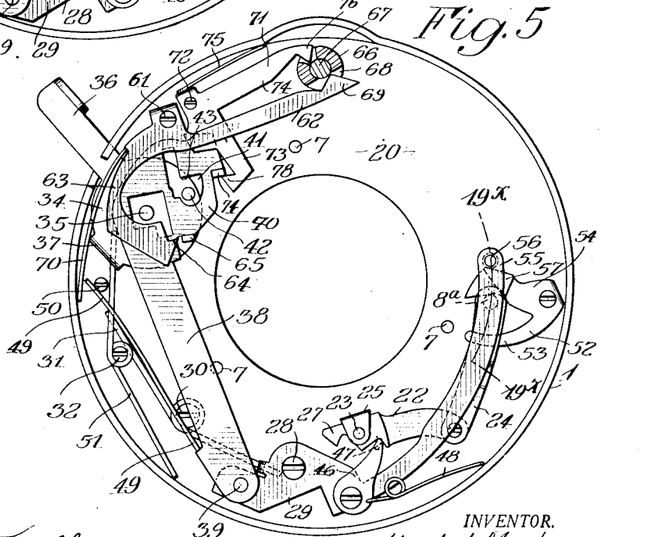
Figure 5 is a view similar to Figure 4 showing the position of the parts after actuation to open the lens aperture.

It will be noted that the notches 26 and 27 incline outwardly from a central portion adjacent the pivot of the blade actuating member and as the arm 46 moves along these inclines in one direction or another, the spring 48 is placed under tension either in contact with the inner wall of the casing, or with the master member. A spring 49 secured to the link 38 engages a fixed stud 50 and tends to maintain the link in normal position with the shoulder 43 in position to be engaged by the stud 42. The trigger is automatically returned to normal position after each actuation by means of the spring 51 coiled about the stud 32 and engaging the trigger and having its free end anchored against the inner wall of the casing. Means are provided for locking the blades against movement when the aperture is open. Said means comprises a detent 52 pivoted in the casing and having two arms 53 and 54 arranged to engage opposite sides of the projections 8ᵃ on the ring 6. The master member is provided with an arm 55 arcuate in form and extending upwardly in the casing over the link 24 and the detent 52, and provided with an inwardly projecting stud or lug 56 adapted to cooperate with the arm 54 of the detent 52. Referring to Figures 3 and 5 of the drawings which show the positions of the parts when the aperture is open, it will be noted that when the ring 6 is in the positions in which the aperture is open, the arm 55 of the master member is in position to engage the projection 56 thereon with the arm 54, or with a lug or projection formed thereon. In the position of the parts shown in Fig. 3 of the drawings, the ring 6 must move in a clockwise direction from the position shown to move the blades to close the aperture. In this position of the parts, the arm 53 of the detent engages the projection on the ring while at the same time the master member engages the arm 54 and prevents movement of the detent and the ring. When the parts are in the position shown in Fig. 5, the ring must move in a counter clockwise direction to move the blades to close the aperture. In this position the arm 54 engages the projection on the ring and is held against movement by the engagement of the projection 56 on the master member with the lug 57 on said arm 54.

Figure 6:
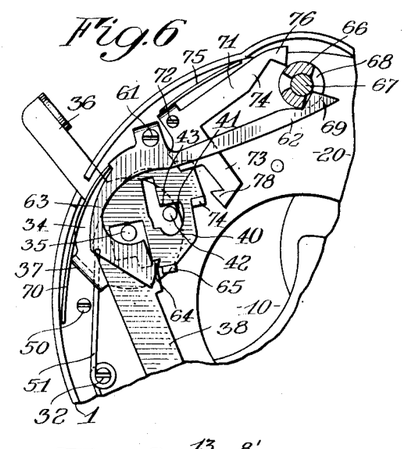
Figure 6 is an enlarged fragmentary view showing the position of the time and bulb levers when the setting devices are set for a bulb exposure.

A shutter as above described is especially adapted for automatic instantaneous exposures, or exposures of short duration. However, it will be understood, that by connecting the operating devices with suitable retarding mechanism, the devices above described may be operated for automatic exposures of longer duration. Means are also provided for securing the so-called bulb and time exposures. This means comprises a bulb lever 60 pivoted at 61 and having an arm 62 extending inwardly and upwardly and adapted to be engaged by the setting devices presently to be described. The other arm 63 of the bulb lever is curved downwardly and inwardly below the pivot 35 of the trigger and at its inner end is provided with a shoulder or projection 64 adapted to cooperate with a lug or projection 65 on the link 38. Near the top of the casing are provided the setting devices adapted to adjust the bulb and time levers into operative and inoperative positions. Said devices comprise a sleeve 66 rotatably mounted on a post 67 fixed in the casing and has a cut out portion, providing a notch or depression 68 with which the bulb lever cooperates. The bulb lever is provided with a projection 69 adjacent the end of the arm 62 which rests in the depression 68 when the sleeve is in proper position. A spring 70 secured to the bulb lever engages the inner wall of the casing and tends to maintain the bulb lever in the position in which the projection 69 engages the sleeve 66 or the depression 68 provided therein. If the trigger is operated with the parts in the Fig. 6 position, the link 38 is retracted as above described, to tension the motor spring the lug 65 engages the end of the arm 63 of the bulb lever, and swings said arm idly out of its path against the action of the spring 70. As soon as the lug 65 rides off the arm 63 the bulb lever is returned to the normal position shown in Fig. 6 by its spring 70, and with the projection 64 in position to engage the lug 65. As soon as the stud 42 rides off the shoulder 43 into the upper leg of the slot, and the motor spring moves the master member to open the blades and return the link 38 which is guided on the stud 42, it will be noted that while the trigger is depressed the stud 42 is nearer the arm 63 of the bulb lever, thus bringing the lug 65 into position to fully engage the shoulder 64, which engagement takes place to arrest the movement of the master member and the blade actuating member at the time when the first set of blades has moved to open the aperture and before the second set has moved from its open position. The parts are maintained in the position just described while the trigger is held depressed. When the trigger is released, it is returned to normal position under the action of its spring, and the stud 42 now engages the inner edge of the slot 41 and swings the link on the master member to release the lug 65 from the shoulder 64, and permits the motor spring to complete the movement of the master member to move the second set of blades to close the aperture. The outer end of the sleeve 66 is enlarged to form a finger piece 66ª having a scale I. B. T. B. I. formed on the outer face thereof and cooperating with a fixed pointer on the casing. The letters on the finger piece indicate the proper adjustments thereof for time, bulb and instantaneous exposures. For the so-called time exposures, I employ a time lever to co-operate with the bulb lever to arrest the movement of the master member when the blades are open and permit the return of the trigger to normal position. A second depression of the trigger releases the master member and permits it to move under the action of its spring to close the aperture. The time lever 71 is pivoted at 72 and is provided with two arms 73 and 74 arranged at substantially right angles to each other. The arm 74 extends to a position where it is adapted to cooperate with the sleeve 66 of the setting devices. A spring 75 is secured to the time lever and engages the inner wall of the casing and tends to move the arm 74 into contact with the setting devices. The arm 74 is provided adjacent its end with a projection 76 adapted to cooperate with the sleeve 66 or a recess 77 provided therefor in the sleeve. The arm 73 of the time lever is provided with a projection or shoulder 78 adapted to engage a lug or projection 79 on the link 38 when the projection 76 engages the recess 77 of the setting device. With the parts set for a time exposure as illustrated in Figure 2, if the trigger is operated the parts move as above described for a bulb exposure until the aperture is open and the lug 65 engages the bulb lever. If the trigger is now released, the upper end of the link swings inwardly under the action of the lug 42 on the trigger, and is held from movement under the action of the motor spring by the bulb lever until the lug 79 engages the shoulder 78 on the time lever, as shown in Fig. 3. At this time, the trigger is free to return fully to normal position under the action of its spring 51. When the trigger is again depressed to close the aperture, the lug 42 enters the elongated portion of the slot 41 in the link and engages the link to withdraw the lug 79 from the shoulder 78 and release the link to permit the master member to complete its movement to move the blades to close the aperture movement of the finger piece from the Fig. 2 position in which it is set for a time exposure in either direction to the position where one of the B points of its scale cooperates with the pointer causes the projection 76 on the time lever to ride out of the depression 77 onto the periphery of the sleeve 66. This movement adjusts the time lever from the position shown in Fig. 3 to a position such as shown in Fig. 6, in which the shoulder 78 is out of position to engage the lug 79. Further movement of the finger piece 66ª until the instantaneous position cooperates with the pointer causes the projection 69 on the bulb lever to move out of its recess onto the periphery of the sleeve 66. The bulb lever then occupies the position shown in Fig. 7 in which the shoulder 64 is out of position to engage the lug 65 on the link 38. During this latter movement of the sleeve 66 the projection 76 on the time lever rides idly on its periphery. It will be noted that I have provided a shutter in which two sets of blades are employed each set operating to alternately open and close the aperture at successive exposures, that is, one set moves to open the aperture at one exposure and to close the aperture at the next succeeding exposure, while the other set moves to close the aperture at the first exposure and to open the aperture at the next succeeding exposure. It will also be noted that since the blades have comparatively large surfaces for engaging the inner wall of the casing at the extreme of their movement and the further fact that they have an idle position with respect to the movement of the ring makes possible the employment of a very strong motor spring without danger of rebound or buckling the blades.

Having described my invention what I claim and desire to secure by Letters Patent, is, 1. In a shutter, the combination of a casing having an aperture therethrough, two sets of blades movable in said casing to open and close said aperture, each set of said blades being adapted to close the aperture independently of the other set, and means for moving said blades.

2. In a shutter, the combination of a casing having an aperture therethrough, two sets of blades movable to open and close said aperture, each set of said blades being adapted to close the aperture independently of the other set, and means for moving one set of blades to open the aperture while the second set remains idle.

3. In a shutter, the combination of a casing having an aperture therethrough, two sets of blades movable to open and close said aperture, each set of said blades being adapted to close the aperture independently of the other set, and devices adapted to move one set of blades to open the aperture and the second set to close the aperture during a single actuation of said devices.

4. In a shutter, the combination of a casing having an aperture therethrough, two sets of blades movable to open and close said aperture, each set of said blades being adapted to close the aperture independently of the other set, and actuating means adapted to move one set of blades to open the aperture while a second set remains idle in open position and the second set to close the aperture while the first set remains idle in open position.

5. In a shutter, the combination of a casing having an aperture therethrough, two sets of blades pivoted in said casing and movable to open and close said aperture, each set of said blades being adapted to close the aperture independently of the other set, and means for moving one set of blades to open or close the aperture while the other set is idle in open position.

6. In a shutter, the combination of a casing having an aperture therethrough, two sets of blades pivoted in said casing and movable to open and close said aperture, a ring operatively connected with said blades and means for moving said ring for operating said blades.

7. In a shutter, the combination of a casing having an aperture therethrough, two sets of blades pivoted in said casing and movable to open and close said aperture, a ring operatively connected with said blades and adapted to move the blades of one set while those of the other set remain idle, and means for actuating said ring.

8. In a shutter, the combination of a casing having an aperture therethrough, two sets of blades pivoted in said casing and movable to open and close said aperture, a ring having a pin and slot connection with said blades arranged to move one set of blades to open the aperture while the second set remains idle in open position and the second set to close the aperture while the first set remains idle in open position by a movement of the ring in one direction, and means for actuating the ring.

9. In a shutter, the combination of a casing having an aperture therethrough, a plurality of blades pivoted in said casing, an oscillatory ring operatively connected with said blades and adapted to move certain of said blades to open the aperture while other blades are idle and certain other blades to close the aperture during movement in one direction, and means for actuating said ring.

10. In a shutter, the combination of a casing having an aperture therethrough, a plurality of blades pivoted in said casing and movable to open and close said aperture, an oscillatory ring operatively connected with said blades and adapted to move them to open the aperture during its initial movement and to move independently of said blades thereafter to the limit of its movement in the same direction and during its initial movement in the reverse direction thereafter again moving said blades to close the aperture, and means for actuating said ring.

11. In a shutter, the combination of a casing having an aperture therethrough, two sets of slotted blades pivoted in said casing and adapted to open and close said aperture, a ring movable in said casing, pins on said ring operatively engaging the slots in said blades and adapted to actuate the blades during a part only of its movement, and means for actuating the ring.

12. In a shutter, the combination of a casing having an aperture therethrough, two sets of slotted blades pivoted in said casing and adapted to open and close said aperture, a ring movable in said casing, pins on said ring operatively engaging the slots in said blades, and adapted to actuate one set of blades to open the aperture while the pins move idly in the slots of the second set of blades and thereafter to move the second set of blades to close the aperture while the pins move idly in the slots of the first set of blades.

13. In a shutter, the combination of a casing having an aperture therethrough, a plurality of pivots fixed in said casing, a pair of blades mounted on each of said pivots and adapted to open and close the aperture, and means for moving the blades of each pair independently to open and close the aperture.

14. In a shutter, the combination of a casing having an aperture therethrough, a plurality of pivots fixed in said casing, a pair of blades mounted on each of said pivots and adapted to open and close the aperture, a movable ring operatively connected with the blades of each pair and adapted to move them independently in the same direction to open and close the aperture, and means for operating said ring.

15. In a shutter, the combination of a casing having an aperture therethrough, two sets of blades movable in said casing to open and close the aperture, and of a form adapted to admit light at a plurality of areas adjacent the margin of the aperture during the opening movement and at a plurality of different areas adjacent the margin of the aperture during the closing movement, and means for actuating said blades.

16. In a shutter, the combination of a casing having an aperture therethrough, a set of blades movable in said casing to open and close said aperture and adapted to admit light simultaneously from the center of the aperture and a plurality of marginal areas during the opening and closing movements thereof, a second set of blades movable in said casing independently of the first set of blades to open and close said aperture alternately with the opening and closing movements of the first set of blades and adapted to admit light simultaneously from the center of the aperture and a plurality of marginal areas, said marginal areas being intermediate the marginal areas of admission of light by the first set of blades, and means for moving one set of blades to open and the other set of blades to close the aperture.

17. In a shutter, the combination of a casing having an aperture therethrough, a set of blades movable in said casing to open and close said aperture and provided with openings adapted to admit light from a plurality of marginal areas simultaneously with the admission of light from the center of the aperture during the opening and closing movements of the blades, a second set of blades movable in said casing independently of the first set of blades to open and close said aperture alternately with the opening and closing movements of the first set of blades and adapted to admit light simultaneously from the center and a plurality of marginal areas during opening and closing movements thereof, said marginal areas being intermediate the marginal areas of admission of light by the first set of blades, and means for moving one set of blades to open and the other set of blades to close the aperture.

18. A blade for a photographic shutter comprising a thin sheet of material of elongated form and having an elongated opening adjacent one of its ends adapted to admit light from the margin of the lens aperture simultaneously with the admission of light from the center thereof.

19. In a shutter, the combination of a casing having an aperture therethrough, two sets of blades in said casing each set movable to open and close said aperture, a blade actuating member operatively connected with said blades and adapted to move one set of blades to open the aperture and the other set to close the aperture when moving in one direction and to move the second set of blades to open the aperture and the first set to close the aperture when moving in the opposite direction, a master member, and an arm on the master member adapted to engage the blade actuating member and move it successively in opposite directions.

20. In a shutter, the combination of a casing having an aperture therethrough, blades in said casing movable to open and close said aperture, a blade actuating member for moving the blades, a pivoted member operatively connected with the blade actuating member, a master member, an arm pivoted on the master member, and a spring associated with said arm and adapted to successively engage the master member and the wall of the casing to swing the arm first in one direction and then another to engage it with the pivoted member on opposite sides of its pivot to actuate said member successively in opposite directions.

21. In a shutter, the combination of a casing having an aperture therethrough, blades in said casing movable to open and close said aperture, a reciprocating ring operatively connected with said blades, a blade actuating member for reciprocating the ring, a master member, and means on the master member for successively moving the blade actuating member in opposite directions.

22. In a shutter, the combination of a casing having an aperture therethrough, blades in said casing movable to open and close said aperture, a reciprocating ring operatively connected with said blades, a pivoted blade actuating member, a link connecting the blade-actuating member to the ring, a master member, and an arm on the master member adapted to engage the blade actuating member successively on opposite sides of its pivot to move it in opposite directions.

23. In a shutter, the combination of a casing having an aperture therethrough, blades in said casing movable to open and close said aperture, a reciprocating ring operatively connected with said blades, a blade actuating member operatively connected with said ring, a master member, means on the master member for moving the blade actuating member successively in opposite directions, and a detent for locking the ring when the aperture is open.

24. In a shutter, the combination of a casing having an aperture therethrough, blades in said casing movable to open and close said aperture, a reciprocating ring operatively connected with said blades, a blade actuating member operatively connected with said ring, a master member, means on the master member for moving the blade actuating member successively in opposite directions, a detent for locking the ring when the aperture is open, and means on the master member for engaging the detent.

25. In a shutter, the combination of a casing having an aperture therethrough, blades in said casing movable to open and close said aperture, a reciprocating ring operatively connected with said blades, a blade actuating member operatively connected with said ring, a master member, means on the master member for moving the blade actuating member successively in opposite directions, a projection on the ring and a detent adapted to engage said projection and lock the ring when the aperture is open.

26. In a shutter, the combination of a casing having an aperture therethrough, blades in said casing movable to open and close said aperture, a reciprocating ring operatively connected with said blades, a blade actuating member operatively connected with said ring, a master member, means on the master member for moving the blade actuating member successively in opposite directions, a projection on the ring, a detent adapted to engage said projection and lock the ring when the aperture is open, and means on the master member for engaging the detent.

27. In a shutter, the combination of a casing having an aperture therethrough, two sets of blades in said casing movable to open and close said aperture, a ring movable successively in opposite directions to move one set of blades to open the aperture and the other set to close the aperture by a single movement in either direction, a detent for locking the ring when the aperture is open, and means for actuating the ring.

28. In a shutter, the combination of a casing having an aperture therethrough, two sets of blades in said casing movable to open and close said aperture, a ring movable successively in opposite directions to move one set of blades to open the aperture and the other set to close the aperture by a single movement in either direction, a detent for locking the ring when the aperture is open, and a master member for operating the ring and adapted to cooperate with the detent.

29. In a shutter, the combination of a casing having an aperture therethrough, two sets of blades in said casing movable to open and close said aperture, a ring movable successively in opposite directions to move one set of blades to open the aperture and the other set to close the aperture by a single movement in either direction, a detent for locking the ring when the aperture is open, a master member cooperating with the detent, and means operatively connecting the master member with the ring and adapted to operate the ring successively in opposite directions.

30. In a shutter, the combination of a casing having an aperture therethrough, blades movable in said casing to open and close the aperture, a master member operatively connected with said blades, a trigger, a link connecting the trigger and the master member, time and bulb levers cooperating with said link, and a setting device for adjusting said levers and movable from a central position in which the levers are adjusted for a time exposure through an angle of less than a semi-circumference in either direction for bulb and instantaneous exposures.

31. In a shutter, the combination of a casing having an aperture therethrough, two sets of blades movable in said casing, a pivot fixed in said casing on which a blade of each set is mounted to move independently of the blades of the other set, and means for moving the blades on said pivot successively in the same direction.

32. In a shutter, the combination of a casing having an aperture therethrough, a pivot fixed in said casing, a pair of blades mounted on said pivot, a movable member, and pin and slot devices connecting said movable member with said blades for moving one of said blades from a position to close the aperture while the second blade is idle and thereafter to move the second blade in the same direction to close the aperture.

33. In a shutter the combination of a casing having an aperture therethrough, two sets of blades in said casing each set comprising a plurality of blades movable to open and close said aperture, a blade actuating member for moving said blades, a master member, and means on the master member for operating the blade actuating member successively in opposite directions.

PAUL J. MARKS.